Patented Nov. 14, 1933

1,934,773

UNITED STATES PATENT OFFICE 1,934,773

AZO DYESTUFFS INSOLUBLE IN WATER AND FIBER DYED THEREWITH

Otto Sohst, deceased, late of Frankfort-on-the-Main-Hochst, Germany, by Adele Sohst, administratrix, Frankfort-on-the-Main-Hochst, Germany, assignor to General Aniline Works, Inc., New York, N. Y., a corporation of Delaware No Drawing. Application July 28, 1930, Serial No. 471,429, and in Germany August 3, 1929

10 Claims. (Cl. 260—95)

The present invention relates to valuable new azo dyestuffs, insoluble in water, and to fiber dyed therewith; more particularly it relates to azo dyestuffs of the following general formula:

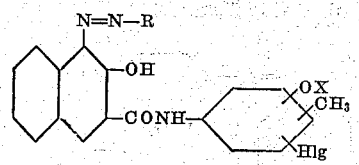

wherein X stands for alkyl, Hlg for halogen and R for a radical of the benzene series which does not contain a sulfonic or a carboxylic acid group.

The new dyestuffs are obtainable by coupling with a 2'.3'-hydroxy-naphthoylamino-halogencresol ether of the following general formula

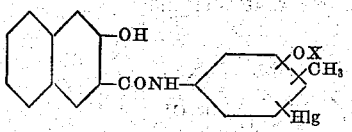

wherein X stands for alkyl and Hlg for halogen, a diazo compound of the benzene series which does not contain a sulfonic group or a carboxylic acid group.

The dyestuffs may be prepared in several ways, for instance on the fiber.

The new dyestuffs may be used for the manufacture of pigment dyes and for the production of dyeings and printings on the vegetable fiber. As pigment dyes, the dyestuffs possess a good fastness to light. When produced on the fiber, there are obtained dyeings of a very satisfastory fastness to kier boiling and a very good fastness to light.

The following examples serve to illustrate the invention, but they are not intended to limit it thereto, the parts being by weight:

Example 1

50 gr. of boiled cotton yarn are treated with the grounding liquor for about ½ hour, hydro-extracted or squeezed, developed in the dye-bath during about ½ hour, rinsed, soaped in a boiling soap bath containing 3 gr. of soap and 1 gr. of sodium carbonate in one liter, well rinsed again and dried.

(a) *Grounding liquor*

4 g. of 2'3'-hydroxynaphthoyl-4-methyl-2-methoxy 5-chloro-1-aminobenzene.
 8 cc. of Turkey red oil of 50% strength and
 8 cc. of caustic soda solution of 34° Bé. are dissolved in boiling water; after cooling to about 50° C.
 4 cc. of a solution of formaldehyde of 30% strength are added and the whole is made up with water to 1000 cc.

(b) *Dyebath*

1,8 g. of the hydrochloride of 4-chloro-2-methyl-1-amino-benzene are diazotized with
 1,8 cc. of hydrochloric acid of 22° Bé. and
 0,75 g. of dissolved sodium nitrite. The solution is neutralized with about
 2 g. of dissolved sodium acetate,
 25 g. of sodium chloride are added and the whole is made up with water to 1000 cc.

There is obtained a brilliant Turkey red dyeing with good fastness properties to chlorine, to boiling lye, to kier boiling and to light.

By substituting for the hydrochloride of 4-chloro-2-methyl-1-amino-benzene, used in the above example, the same quantity of 5-chloro-2-methyl-1-amino-benzene, a scarlet dyeing of the same fastness properties is obtained.

Example 2

(a) *Grounding liquor* is the same as described in Example 1.
(b) *Dyebath:*

2,2 g. of 4-bromo-5-chloro-2-methyl-1-amino-benzene are diazotized with
 3,8 cc. of hydrochloric acid and
 0,75 g. of dissolved sodium nitrite. The solution is neutralized with about
 2 g. of sodium acetate and about 1 g. of dissolved sodium bicarbonate,
25 g. of sodium chloride are added and the whole is made up with water to 1000 cc.

There is obtained a vivid Turkey red dyeing having the same fastness properties as the dyeing of Example 1 has.

Example 3

(a) *Grounding liquor* of
4 g. of 2'3'-hydroxynaphthoyl-2-methyl-5-methoxy-4-chloro-1-amino-benzene is prepared as described in Example 1.

(b) *Dyebath:*

1,6 g. of the hydrochloride of asymmetrical m-xylidine are diazotized with
1,8 cc. of hydrochloric acid of 22° Bé. and
0,75 g. of sodium nitrite. The solution is neutralized with about
1 g. of sodium bicarbonate,
25 g. of sodium chloride are added and the whole is made up with water to 1000 cc.

A vivid Turkey red dyeing of good fastness properties to chlorine and to boiling lye and of good fastness to kier boiling and to light is obtained.

By using in the grounding liquor 2'.3'-hydroxynaphthoyl-5-methyl-2-methoxy-4-chloro-1-amino-benzene and by using the dyebath described in Examples 1 and 3, medium red to yellowish red dyeings are obtained having similar fastness properties.

What is claimed is:

1. The azo dyestuffs, insoluble in water, of the following general formula:

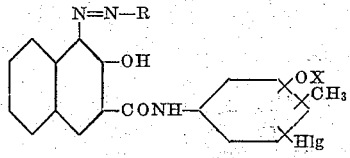

wherein X stands for alkyl, Hlg for halogen and R for a radical of the benzene series, being in the dry state red to bluish-red powders having as pigments a good fastness to light and on the fiber a satisfactory fastness to kier boiling and a very good fastness to light.

2. The azo dyestuffs, insoluble in water, of the following general formula:

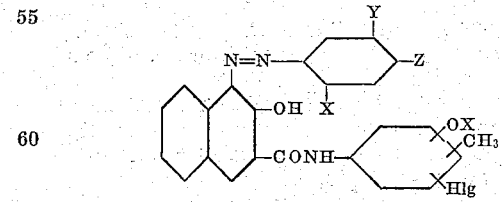

wherein the two X's stand for alkyl, Hlg for halogen, Y for hydrogen or halogen and Z for alkyl or halogen, being in the dry state red-yellowish powders, having as pigments a good fastness to light and on the fiber a satisfactory fastness to kier boiling and a very good fastness to light.

3. The azo dyestuff, insoluble in water, of the following probable formula:

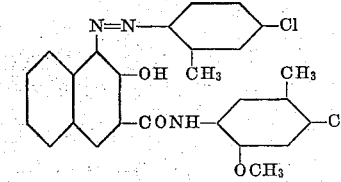

being in the dry state a yellowish-red powder having as pigment a good fastness to light and on the fiber a satisfactory fastness to kier boiling and a very good fastness to light.

4. Fiber dyed with the azo dyestuffs, claimed in claim 1.

5. Fiber dyed with the azo dyestuffs, claimed in claim 2.

6. Fiber dyed with the azo dyestuff, claimed in claim 3.

7. The azo dyestuff, insoluble in water, of the following probable formula:

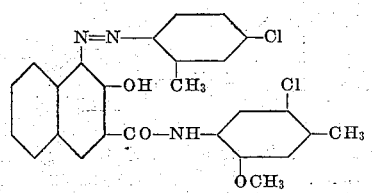

yielding when produced on the fiber a brilliant Turkey red dyeing of good fastness properties to kier boiling and to light.

8. The azo dyestuff, insoluble in water, of the following probable formula:

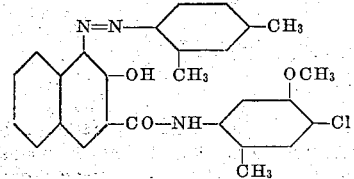

yielding when produced on the fiber a vivid Turkey red dyeing of good fastness properties to chlorine, kier boiling and to light.

9. Fiber dyed with the azo dyestuff claimed in claim 7.

10. Fiber dyed with the azo dyestuff claimed in claim 8.

ADELE SOHST,
*Administratrix of Otto Sohst, Deceased.*